(12) United States Patent
Brodjonegoro et al.

(10) Patent No.: US 12,384,709 B2
(45) Date of Patent: Aug. 12, 2025

(54) WASTEWATER TREATMENT PROCESS IN PRODUCTION OF NICKEL COBALT HYDROXIDE

(71) Applicants: PT ESG NEW ENERGY MATERIAL, Jakarta (ID); PT QMB NEW ENERGY MATERIALS, Jakarta (ID); GEM CO., LTD., Shenzhen (CN); PT GEM INDONESIA NEW ENERGY MATERIALS, Jakarta (ID)

(72) Inventors: Satryo Soemantri Brodjonegoro, Jakarta (ID); Kaihua Xu, Shenzhen (CN); Rizky Wanaldi, Jakarta (ID); Andi Syaputra Hasibuan, Jakarta (ID); Tegar Mukti Aji, Jakarta (ID); Piyan Rahmadi, Jakarta (ID); Emil Salim, Jakarta (ID); Xiaodong Yan, Jakarta (ID)

(73) Assignees: PT ESG NEW ENERGY MATERIAL, Jakarta (ID); PT QMB NEW ENERGY MATERIALS, Jakarta (ID); GEM CO., LTD., Shenzhen (CN); PT GEM INDONESIA NEW ENERGY MATERIALS, Jakarta (ID)

( * ) Notice: Subject to any disclaimer, the term of this patent is extended or adjusted under 35 U.S.C. 154(b) by 0 days.

(21) Appl. No.: 18/870,444

(22) PCT Filed: Jun. 30, 2023

(86) PCT No.: PCT/CN2023/105021
§ 371 (c)(1),
(2) Date: Nov. 28, 2024

(87) PCT Pub. No.: WO2025/000490
PCT Pub. Date: Jan. 2, 2025

(65) Prior Publication Data
US 2025/0171342 A1 May 29, 2025

(51) Int. Cl.
*C02F 9/00* (2023.01)
*C02F 1/26* (2023.01)
(Continued)

(52) U.S. Cl.
CPC ............... *C02F 9/00* (2013.01); *C02F 1/26* (2013.01); *C02F 1/5236* (2013.01); *C02F 1/54* (2013.01);
(Continued)

(58) Field of Classification Search
None
See application file for complete search history.

(56) References Cited

U.S. PATENT DOCUMENTS 8,361,191 B2 * 1/2013 Dreisinger ............ C22B 23/043
423/139
2004/0228783 A1 * 11/2004 Harris ................. C22B 23/0461
423/140
(Continued)

FOREIGN PATENT DOCUMENTS

CN 101768665 A 7/2010

OTHER PUBLICATIONS

Claims of PCT/CN2023/105021.
CNIPA (ISA), Written opinion for PCT/CN2023/105021, Dec. 7, 2023.

*Primary Examiner* — Clare M Perrin
(74) *Attorney, Agent, or Firm* — Hemisphere Law, PLLC; Zhigang Ma

(57) ABSTRACT

A wastewater treatment process in the production of nickel cobalt hydroxide includes the following steps: S1. subjecting a laterite nickel ore acid-leaching solution successively
(Continued)

to iron-aluminum removal and nickel-cobalt precipitation to obtain wastewater; S2. subjecting the wastewater successively to chromium ions, manganese ions, and silicon ion removal treatments to obtain a suspension; and S3. reusing portion of the suspension and continuing iron-aluminum removal; subjecting the remaining suspension successively to homogenizing, alkali adjusting, standing still, CCD counter-current washing, and solid-liquid separation to obtain a supernatant and a residue phase, collecting the residue phase, and discharging the supernatant after neutralization. This method used to treat the laterite nickel ore wastewater can meet the discharge standard, with high safety.

9 Claims, 1 Drawing Sheet

(51) Int. Cl.
| | |
|---|---|
| *C02F 1/52* | (2023.01) |
| *C02F 1/54* | (2023.01) |
| *C02F 1/60* | (2023.01) |
| *C02F 1/64* | (2023.01) |
| *C02F 1/66* | (2023.01) |
| *C02F 1/70* | (2023.01) |
| *C22B 3/44* | (2006.01) |
| *C02F 1/00* | (2023.01) |
| *C02F 101/20* | (2006.01) |
| *C02F 103/16* | (2006.01) |

(52) U.S. Cl.
CPC ............... *C02F 1/60* (2013.01); *C02F 1/64* (2013.01); *C02F 1/66* (2013.01); *C02F 1/70* (2013.01); *C22B 3/44* (2013.01); *C02F 2001/007* (2013.01); *C02F 2101/203* (2013.01); *C02F 2103/16* (2013.01); *C02F 2209/02* (2013.01); *C02F 2209/03* (2013.01); *C02F 2209/06* (2013.01); *C02F 2301/08* (2013.01)

(56) References Cited

U.S. PATENT DOCUMENTS

| | | |
|---|---|---|
| 2011/0110832 A1 | 5/2011 | Clareti Pereira et al. |
| 2022/0267877 A1* | 8/2022 | Smit ................ C01G 51/04 |

* cited by examiner

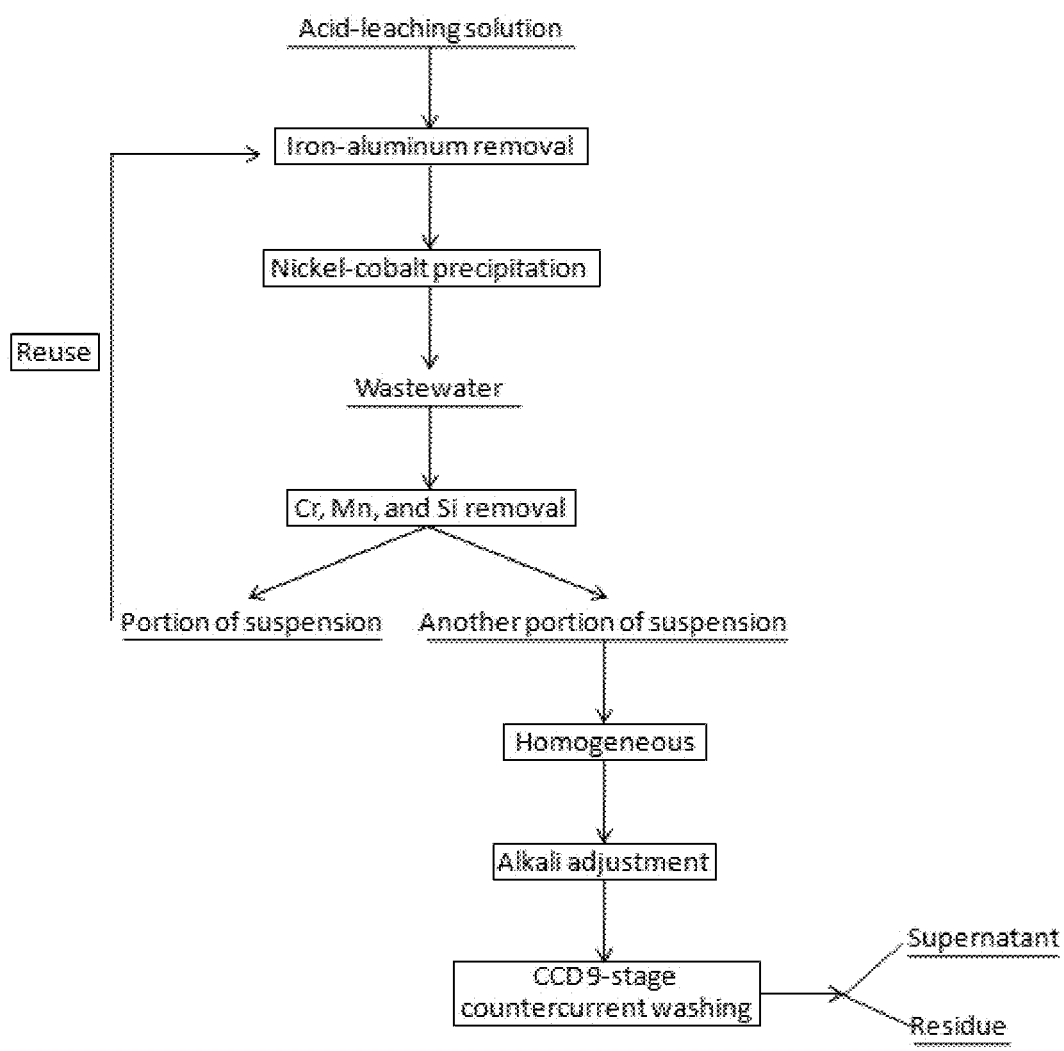

WASTEWATER TREATMENT PROCESS IN PRODUCTION OF NICKEL COBALT HYDROXIDE

FIELD OF THE DISCLOSURE

The disclosure relates to the technical field of metallurgical wastewater treatment, and in particular to a wastewater treatment process in the production of nickel cobalt hydroxide.

BACKGROUND

The laterite nickel ore wastewater mainly contains nickel, cobalt, iron, zinc, manganese, sulfate, and other pollutants. The common treatment method for laterite nickel ore wastewater is to add lime milk to precipitate and remove manganese in the laterite nickel ore tailings after neutralization. After filtration, the wastewater is discharged to the sea. In order to make the wastewater discharge meet the discharge standard and realize the resource utilization in the treatment process, the main focus is on removing nickel ions while ensuring the clarity and safety of the effluent. Therefore, it is necessary to improve the commonly used treatment methods for the laterite nickel ore wastewater.

In the related art, the patent with the publication number CN217026042U discloses a nickel-cobalt removal system for a neutralized liquid of a laterite nickel ore tailing. In this solution, the neutralized liquid of the laterite nickel ore tailing is first filtered by a filtration unit, which can effectively reduce the content of solids (such as leaching residue, neutralization residue, or sand) in the neutralized liquid. Then, the above-mentioned filtered liquid is subjected to an adsorption treatment by using an adsorption unit. Nickel and cobalt in the neutralized liquid of the laterite nickel ore tailing are removed via at least three sets of adsorption units arranged in parallel. Finally, a desorbent is introduced into the adsorption unit through a desorbent supply unit, and the adsorption unit is subjected to circulation desorption through the above circulation line.

Although nickel and cobalt are recycled in an above-mentioned manner, other pollutants such as iron, aluminum, manganese, silicon, and chromium with high concentrations are not completely treated, and the recycling of wastewater cannot be realized.

SUMMARY

In view of this, the disclosure provides a wastewater treatment process in the production of nickel cobalt hydroxide, wherein the clean wastewater can reach the discharge standard and has high safety.

To achieve the above technical objectives, the disclosure adopts the following technical solutions:

The disclosure provides a wastewater treatment process in the production of nickel cobalt hydroxide, including the following steps:
S1. subjecting a laterite nickel ore acid-leaching solution successively to iron-aluminum removal and nickel-cobalt precipitation to obtain wastewater;
S2. subjecting the wastewater successively to chromium ions, manganese ions, and silicon ion removal treatments to obtain a suspension; and
S3. reusing portion of the suspension and continuing iron-aluminum removal; subjecting the remaining suspension successively to homogenizing, alkali adjusting, standing still, CCD counter-current washing, and solid-liquid separation to obtain a supernatant and a residue phase, collecting the residue phase, and discharging the supernatant after neutralization.

Preferably, the number of CCD washing stages is 9, and the washing ratio is 2.0-2.5.

Preferably, the steps of chromium ion removal are as follows: adding a reducing agent to the wastewater to perform a reduction reaction, followed by precipitation and separation to obtain a primary liquid; the reducing agent is a biomass straw hydrolysate; the preparation method of the biomass straw hydrolysate is as follows: grinding biomass straw into powder, and then adding concentrated sulfuric acid for hydrolysis.

Preferably, the steps of manganese ion removal are as follows: introducing a mixed gas of $SO_2$ and air into the primary liquid, adjusting the pH of the primary liquid to 3-4 and the temperature to 30-80° C., precipitating, and separating to obtain a secondary liquid.

Preferably, the steps of silicon ion removal are as follows: adjusting the pH of the secondary liquid to 1-2 at a pressure of 4.5-5.5 MPa and controlling the temperature to 150-200° C., precipitating, and separating to obtain a suspension.

Preferably, in step S3, the reused suspension accounts for 20-30% of the total suspension by mass.

Preferably, the iron-aluminum removal step includes one-stage iron-aluminum removal and two-stage iron-aluminum removal.

Preferably, the process conditions for one stage of iron-aluminum removal include: controlling the temperature to 80-85° C. and the pH to 3.6-4.0.

Preferably, the process conditions for the two-stage iron-aluminum removal include: controlling the temperature to 75-80° C., and controlling the pH to 4.6-5.0 by using NaOH.

Preferably, the process conditions for nickel-cobalt precipitation include: adjusting the pH to 7.8-8.3 by using NaOH, adjusting the reaction temperature to 70° C., and the reaction time to 3-4 min.

Advantageous Effect of the Application

The wastewater treatment process of the disclosure can realize the resource utilization of the laterite nickel ore wastewater, and the liquid obtained after purification has a high degree of clarity and high safety, reaching the emission standard;

The wastewater treatment process of the disclosure recycles sodium salts and sulfates via a recycling process, reduces the amount of sodium sulfate, and has a good liquid-residue separation effect;

The process sequence of iron-aluminum removal, nickel-cobalt precipitation, chromium ion removal, manganese ion removal, and silicon ion removal in the disclosure is beneficial to raw material saving. The pH value in the liquid firstly increases and then decreases, with less mutual interference, and the treatment of each impurity ion is more thorough.

The disclosure introduces a multi-stage CCD counter-current washing in the wastewater treatment process, which overcomes the disadvantage that the suspension cannot be directly subjected to pressure filtration for solid-liquid separation.

BRIEF DESCRIPTION OF THE DRAWING

FIGURE is a process flow diagram of this scheme.

DETAILED DESCRIPTION OF PREFERRED EMBODIMENTS

In order that the objects, aspects, and advantages of the disclosure will become more apparent, a more particular description of the disclosure will be rendered by reference to the embodiments. It should be understood that the particular embodiments described herein are illustrative only and are not restrictive.

As shown in FIGURE, a wastewater treatment process in the production of nickel cobalt hydroxide includes the following steps:

S1. subjecting a laterite nickel ore acid-leaching solution successively to iron-aluminum removal and nickel-cobalt precipitation to obtain wastewater;

S2. subjecting the wastewater successively to chromium ions, manganese ions, and silicon ion removal treatments to obtain a suspension; and S3. reusing portion of the suspension and continuing iron-aluminum removal; subjecting the remaining suspension successively to homogenizing, alkali adjusting, standing still, CCD counter-current washing, and solid-liquid separation to obtain a supernatant and a residue phase, collecting the residue phase, and discharging the supernatant after neutralization.

The disclosure relates to the reuse of the suspension. It is known to a person skilled in the art that there are a large number of sodium ions and sulfate ions after the laterite nickel ore is subjected to acid leaching—iron-aluminum removal—nickel-cobalt precipitation, and therefore there will be a large number of sodium salts and sulfate salts in both the wastewater and the subsequent suspension. The reuse of portion of the suspension to the iron-aluminum removal step in this scheme can reduce the use of auxiliary materials and further remove the residual iron ions in the wastewater. The sodium sulfate reacts with the iron ions in the wastewater to form $NaFe_3(SO_4)_2(OH)_6$ precipitate as follows:

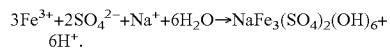

In this scheme, the number of stages of CCD counter-current washing is 9 and the washing ratio is 2.0-2.5. Since the suspension contains a large amount of solid particles and is in a flocculent state, it is not easy to directly perform solid-liquid separation by a filter and a filter press, a multi-stage CCD counter-current washing process is designed in the disclosure. In the CCD counter-current washing of the disclosure, 9 thickeners are used to perform a solid-liquid separation on the treated suspension, then the residues obtained from the 8 thickeners are fed to thickener No. 9. The thickener No. 9 further performs a filtration, precipitation, and washing on the residues obtained from the precipitation Nos. 1-8, and the residue from the thickener No. 9 enters a filter press for filter pressing, finally achieving the solid-liquid separation.

The steps for chromium ion removal are as follows: adding a reducing agent to the wastewater to perform a reduction reaction, followed by precipitation and separation to obtain a primary liquid; the reducing agent is a biomass straw hydrolysate. The preparation method of the biomass straw hydrolysate is as follows: grinding biomass straw into powder, and then adding concentrated sulfuric acid for hydrolysis; the hydrolysis temperature is 30-80° C.; the solid-liquid ratio of the hydrolysis is 10-100 g/L; and the hydrolysis time is 1-20 h. The original biomass straw does not have reducibility, but the biomass straw is subjected to acid hydrolysis to obtain an aldehyde substance, which can be used as a reducing agent. After adding the reducing agent, hexavalent chromium ions in the wastewater are converted into trivalent chromium and precipitated in the form of $Cr(OH)_3$, thereby removing chromium from the wastewater, and obtaining a primary liquid by precipitation and separation.

The steps for manganese ion removal are as follows: introducing a mixed gas of $SO_2$ and air into the primary liquid, adjusting the pH of the primary liquid to 3-4 and the temperature to 30-80° C., precipitating, and separating to obtain a secondary liquid, wherein the precipitate is $MnO_2$ or $Mn_3O_4$. The reaction formulas for manganese ion removal are as follows:

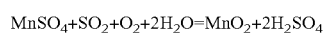

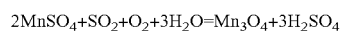

The steps for silicon ion removal are as follows: adjusting the pH of the secondary liquid to 1-2 under a pressure of 4.5-5.5 MPa, controlling the temperature to 150-200° C., precipitating, and separating to obtain a suspension. In this process, the silicate combines with hydrogen ions and is converted into a water-insoluble silicic acid precipitate. Under the conditions of high temperature and high pressure, the silicic acid is removed as silica, and a suspension is obtained after precipitation and separation. A benefit of converting silicic acid to silica is that the problem of extreme difficulty in the filtration of silicic acid due to its presence in solution, mostly in the form of hydrogels, is overcome.

In the treatment processes for chromium ions, manganese ions, and silicon ion removal, due to the presence of a large number of flocculent substances in the precipitated liquid, precipitate separation is carried out by using pipelines to extract the liquid from above the reaction tank, and the obtained liquid enters the next treatment step.

In step S3, the reused suspension accounts for 20-30% of the whole suspension by mass, and the reused suspension carries a large amount of sodium ions and sulfate ions, which can reduce the use of sodium salts and sulfate salts. However, it would increase the difficulty of removing iron and aluminum and precipitating nickel and chromium due to the hindrance of particles in the liquid to recycle the excessive suspension.

The iron-aluminum removal step includes one-stage iron-aluminum removal and two-stage iron-aluminum removal.

The process conditions for the one-stage iron-aluminum removal include: controlling the temperature to 80-85° C., and the pH to 3.6-4.0; precipitating to obtain a residue phase to remove iron and aluminum; in the one-stage iron-aluminum removal, copper, zinc, scandium, and other impurity metals can be also removed simultaneously.

The process conditions for the two-stage iron-aluminum removal include: controlling the temperature to 75-80° C., and adjusting the pH to 4.6-5.0 using NaOH; after precipitation, obtaining a residue phase to further remove iron and aluminum.

The process conditions for nickel-cobalt precipitation include: adjusting the pH to 7.8-8.3 by using NaOH, adjusting the reaction temperature to 70° C., and the reaction time to 3-4 min; precipitating to obtain a residue phase as nickel cobalt hydroxide, which is used for subsequent production, and a liquid as wastewater, which enters the next stage of treatment.

The CCD 9-stage counter-current washing of the disclosure is achieved by the following devices: the CCD thickening device is provided with 9 thickeners arranged in sequence and a filter press connected to the last thickener. Specifically, the CCD thickening device is provided with 8 thickening ponds, wherein the first eight thickeners are arranged in sequence to perform solid-liquid separation on the wastewater, the residue of the first eight thickeners is fed to the ninth thickener, the residues obtained from the precipitations of No. 1-No. 8 are further filtered and precipitated and washed by the thickener No. 9, and the residue from No. 9 is subjected to pressure filtration by a pressure filter.

The following provides further explanation of this scheme through specific examples.

Example 1

A wastewater treatment process in the production of nickel cobalt hydroxide included the following steps:

S1. The acid-leaching solution of the laterite nickel ore was successively subjected to iron-aluminum removal and nickel-cobalt precipitation to obtain wastewater. The steps of iron-aluminum removal included a one-stage iron-aluminum removal and a two-stage iron-aluminum removal. The process conditions for the one-stage iron-aluminum removal included: controlling the temperature to 80° C. and the pH to 3.6. The process conditions for the two-stage iron-aluminum removal included: controlling the temperature to 75° C. and adjusting the pH to 4.6 using NaOH. The process conditions for nickel-cobalt precipitation included: adjusting the pH value to 7.8 by using NaOH, the reaction temperature to 70° C., and the reaction time to 3 min.

S2. The wastewater was subjected successively to chromium ions, manganese ions, and silicon ion removal treatments to obtain a suspension. The steps of chromium ion removal included: adding a reducing agent to the wastewater to perform a reduction reaction, followed by precipitation and separation to obtain a primary liquid. The reducing agent was a biomass straw hydrolysate. The preparation method of the biomass straw hydrolysate included: grinding the biomass straw into a powder and then adding concentrated sulfuric acid for hydrolysis. The hydrolysis temperature was 80° C.; the solid-liquid ratio of the hydrolysis was 10 g/L; and the hydrolysis time was 20 h. The steps for manganese ion removal included: introducing a mixed gas of $SO_2$ and air into the primary liquid, adjusting the pH of the primary liquid to 3 and the temperature to 30° C., precipitating, and separating to obtain a secondary liquid. The steps for silicon ion removal included: adjusting the pH of the secondary liquid to 1 under a pressure of 4.5 MPa, controlling the temperature to 150° C., precipitating, and separating to obtain a suspension.

S3. The 30% suspension was reused and continued to iron-aluminum removal. The remaining suspension was subjected successively to homogenizing, alkali adjusting, standing still, CCD counter-current washing, and solid-liquid separation to obtain a supernatant and a residue phase. The residue phase was collected, and the supernatant after neutralization was discharged. The number of CCD counter-current washing stages was 9 and the wash ratio was 2.0.

Example 2

A wastewater treatment process in the production of nickel cobalt hydroxide included the following steps:

S1. The acid-leaching solution of the laterite nickel ore was successively subjected to iron-aluminum removal and nickel-cobalt precipitation to obtain wastewater. The steps of iron-aluminum removal included a one-stage iron-aluminum removal and a two-stage iron-aluminum removal. The process conditions for the one-stage iron-aluminum removal included: controlling the temperature to 85° C. and the pH to 4.0. The process conditions for the two-stage iron-aluminum removal included: controlling the temperature to 80° C. and adjusting the pH to 5.0 using NaOH. The process conditions for nickel-cobalt precipitation included: adjusting the pH value to 8.3 by using NaOH, the reaction temperature to 70° C., and the reaction time to 4 min.

S2. The wastewater was subjected successively to chromium ions, manganese ions, and silicon ion removal treatments to obtain a suspension. The steps of chromium ion removal included: adding a reducing agent to the wastewater to perform a reduction reaction, followed by precipitation and separation to obtain a primary liquid. The reducing agent was a biomass straw hydrolysate. The preparation method of the biomass straw hydrolysate included: grinding the biomass straw into a powder and then adding concentrated sulfuric acid for hydrolysis. The hydrolysis temperature was 30° C.; the solid-liquid ratio of the hydrolysis was 100 g/L; and the hydrolysis time was 1 h. The steps for manganese ion removal included: introducing a mixed gas of $SO_2$ and air into the primary liquid, adjusting the pH of the primary liquid to 4 and the temperature to 80° C., precipitating, and separating to obtain a secondary liquid. The steps for silicon ion removal included: adjusting the pH of the secondary liquid to 2 under a pressure of 5.5 MPa, controlling the temperature to 200° C., precipitating, and separating to obtain a suspension.

S3. The 20% suspension was reused and continued to iron-aluminum removal. The remaining suspension was subjected successively to homogenizing, alkali adjusting, standing still, CCD counter-current washing, and solid-liquid separation to obtain a supernatant and a residue phase. The residue phase was collected, and the supernatant after neutralization was discharged. The number of CCD counter-current washing stages was 9 and the wash ratio was 2.5.

Test and Evaluation

The concentrations of pollutants in the laterite nickel ore wastewater and the test results of the concentrations of each pollutant after the treatment of Example 1 are shown in Table 1.

TABLE 1

Comparison of pollutant concentration before and after treatment

| Pollutant substance | Original wastewater ion concentration (mg/L) | Supernatant ion concentration after treatment(mg/L) |
|---|---|---|
| Cu | 0.51 | 0.008 |
| Zn | 0.24 | 0.007 |
| Cr | 0.42 | 0.039 |
| Pb | 0.32 | 0.015 |
| Si | 0.42 | 0.017 |
| Ni | 5.2 | 0.005 |
| Fe | 6.1 | 0.014 |
| Co | 3.7 | 0.2 |
| Mn | 270 | 15 |
| Al | 5.6 | 0.04 |

It can be seen from the above-mentioned results that the resource utilization of the laterite nickel ore wastewater can be realized, and the liquid obtained after purification has a high degree of clarity and high safety, reaching the discharge standard.

The above is only the preferred specific implementation method of the disclosure, and the scope of the disclosure is not limited to this. Any changes or replacements that can be easily thought of by technical personnel familiar with the technical field within the scope of disclosure in the disclosure should be covered within the scope of the disclosure.

What is claimed is:

1. A wastewater treatment process in the production of associated with nickel cobalt hydroxide production, comprising the following steps:
   S1 subjecting a laterite nickel ore acid-leaching solution successively to iron-aluminum removal and nickel-cobalt precipitation to obtain wastewater;
   S2 subjecting the wastewater successively to chromium ions, manganese ions, and silicon ion removal treatments to obtain a suspension; and
   S3 reusing a portion of the suspension and continuing iron-aluminum removal; subjecting the remaining suspension successively to homogenizing, alkali adjusting, standing still, CCD counter-current washing, and solid-liquid separation to obtain a supernatant and a residue phase, collecting the residue phase, and discharging the supernatant after neutralization;
   wherein the steps of chromium ion removal are as follows: adding a reducing agent to the wastewater to perform a reduction reaction, followed by precipitation and separation to obtain a primary liquid; the reducing agent is a biomass straw hydrolysate; the preparation method of the biomass straw hydrolysate is as follows: grinding biomass straw into powder, and then adding concentrated sulfuric acid for hydrolysis.

2. The wastewater treatment process associated with nickel cobalt hydroxide production according to claim 1, wherein the number of CCD counter-current washing stages is 9 and the washing ratio is 2.0-2.5.

3. The wastewater treatment process associated with nickel cobalt hydroxide production according to claim 1, wherein the steps of manganese ion removal are as follows: introducing a mixed gas of SO2 and air into the primary liquid, adjusting the pH of the primary liquid to 3-4 and the temperature to 30-80° C., precipitating, and separating to obtain a secondary liquid.

4. The wastewater treatment process associated with nickel cobalt hydroxide production according to claim 3, wherein the steps of silicon ion removal are as follows: adjusting the pH of the secondary liquid to 1-2 at a pressure of 4.5-5.5 MPa and controlling the temperature to 150-200° C., precipitating, and separating to obtain the suspension.

5. The wastewater treatment process associated with nickel cobalt hydroxide production according to claim 1, wherein in step S3, the reused suspension accounts for 20-30% of the total suspension by mass.

6. The wastewater treatment process associated with nickel cobalt hydroxide production according to claim 1, wherein the step of iron-aluminum removal comprises a first stage iron-aluminum removal and a second stage iron-aluminum removal.

7. The wastewater treatment process associated with nickel cobalt hydroxide production according to claim 6, wherein the process conditions for the first stage iron-aluminum removal comprise: controlling the temperature to 80-85° C. and the pH to 3.6-4.0.

8. The wastewater treatment process associated with nickel cobalt hydroxide production according to claim 6, wherein the process conditions for the two-stage second stage iron-aluminum removal comprise: controlling the temperature to 75-80° C. and the pH to 4.6-5.0 by using NaOH.

9. The wastewater treatment process associated with nickel cobalt hydroxide production according to claim 1, wherein the process conditions for nickel-cobalt precipitation comprise: adjusting the pH to 7.8-8.3 by using NaOH, adjusting the reaction temperature to 70° C., and the reaction time to 3-4 min.

* * * * *